(12) United States Patent
D'Aurelio et al.

(10) Patent No.: US 9,032,383 B2
(45) Date of Patent: May 12, 2015

(54) AUTOMATICALLY UPDATING APPLICATIONS ON A CLIENT'S DEVICE WITHOUT INTERRUPTING THE USER'S EXPERIENCE

(71) Applicant: Microsoft Corporation, Redmond, WA (US)

(72) Inventors: Ryan James D'Aurelio, Seattle, WA (US); Mark John Sawrey Leece, Bellevue, WA (US); Douglas Duane Berrett, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/629,149

(22) Filed: Sep. 27, 2012

(65) Prior Publication Data

US 2013/0227539 A1    Aug. 29, 2013

Related U.S. Application Data

(60) Provisional application No. 61/605,119, filed on Feb. 29, 2012.

(51) Int. Cl.
*G06F 9/44* (2006.01)
*G06F 15/16* (2006.01)
(Continued)

(52) U.S. Cl.
CPC .......... *G06F 17/30893* (2013.01); *G06F 3/048* (2013.01); *G06F 15/16* (2013.01); *G06F 21/00* (2013.01)

(58) Field of Classification Search
CPC ............... G06F 8/61; G06F 8/65; G06F 8/60; G06F 9/44; G06F 9/445; G06F 8/71; G06F 8/20; G06F 8/67; G06F 8/68; G06F 9/5055; G06F 17/30893; G06F 8/62; G06F 8/63; G06F 8/70; G06F 8/72; G06F 9/44505; G06F 9/44521
USPC ........................................................ 717/169
See application file for complete search history.

(56) References Cited

U.S. PATENT DOCUMENTS 6,404,445 B1     6/2002 Galea et al.
6,493,871 B1 *  12/2002 McGuire et al. .............. 717/173

(Continued)

OTHER PUBLICATIONS

"DB2 Connect and Application Servers," Retrieved on: Jul. 19, 2012, Available at: http://publib.boulder.ibm.com/infocenter/db2luw/v8/index.jsp?topic=/com.ibm.db2.udb.doc/conn/c0004784.htm, 3 pages.

(Continued)

*Primary Examiner* — Don Wong
*Assistant Examiner* — Reshaun M Finkley
(74) *Attorney, Agent, or Firm* — Micah Goldsmith; Judy Yee; Micky Minhas

(57) ABSTRACT

Portions of an application can be delivered through a network without having to download the entire application. When an application is installed, HTML, CSS and JavaScripts® or other User Interface (UI) files can be copied into local cache. A version number can also be stored with this code, so that when the application is launched, a web service checks the latest version on a server computer. If the latest version differs from the cached version, then an update is needed. New UI files can then be downloaded to the local cache. The local cache can be a folder that is used by the application, wherein the folder is stored on a hard drive of the client device. Binaries associated with the application can be stored in a different folder.

19 Claims, 7 Drawing Sheets

(51) Int. Cl.
   *G06F 17/30* (2006.01)
   *G06F 3/048* (2013.01)
   *G06F 21/00* (2013.01)

(56) References Cited

U.S. PATENT DOCUMENTS

| | | | |
|---|---|---|---|
| 6,567,104 | B1 | 5/2003 | Andrew et al. |
| 6,983,421 | B1 | 1/2006 | Lahti et al. |
| 7,051,069 | B2 | 5/2006 | Smithline et al. |
| 7,058,944 | B1 | 6/2006 | Sponheim et al. |
| 7,478,381 | B2 | 1/2009 | Roberts et al. |
| 7,853,943 | B2 | 12/2010 | McCaleb et al. |
| 7,895,173 | B1 | 2/2011 | Dedu-Constantin et al. |
| 8,146,069 | B2 * | 3/2012 | Shamilian et al. ............ 717/157 |
| 2001/0044738 | A1 | 11/2001 | Elkin et al. |
| 2005/0021791 | A1 | 1/2005 | Sakiyama et al. |
| 2006/0047693 | A1 | 3/2006 | Kojima et al. |
| 2006/0265662 | A1 | 11/2006 | Gertzen |
| 2007/0244990 | A1 | 10/2007 | Wells |
| 2008/0082604 | A1 | 4/2008 | Mansour et al. |
| 2008/0189235 | A1 | 8/2008 | Mital et al. |
| 2009/0144632 | A1 | 6/2009 | Mendez |
| 2009/0183145 | A1 * | 7/2009 | Hu et al. ...................... 717/168 |
| 2009/0300496 | A1 | 12/2009 | Fan et al. |
| 2010/0100823 | A1 | 4/2010 | Ewe et al. |
| 2010/0146481 | A1 * | 6/2010 | Binder et al. ................. 717/110 |
| 2010/0281107 | A1 | 11/2010 | Fallows et al. |
| 2010/0313248 | A1 | 12/2010 | Krivosheev et al. |
| 2010/0318987 | A1 | 12/2010 | Barr et al. |
| 2011/0321027 | A1 * | 12/2011 | Andrews et al. .............. 717/169 |
| 2012/0072548 | A1 | 3/2012 | Kim |
| 2012/0167063 | A1 * | 6/2012 | Detwiler et al. .............. 717/139 |
| 2013/0226994 | A1 | 8/2013 | D'Aurelio et al. |
| 2013/0227657 | A1 | 8/2013 | D'Aurelio et al. |
| 2014/0059528 | A1 * | 2/2014 | Gagliardi ...................... 717/170 |

OTHER PUBLICATIONS

"Expression Blend® 4," Published on: Nov. 10, 2010, Available at: http://www.microsoft.com/expression/products/Blend_Overview.aspx, 3 pages.

Fraternali, et al., "Rich Internet Applications," In Proceedings of IEEE Internet Computing, vol. 14, May 2010, 4 pages.

"Introducing Host Access Transformation Services," Retrieved on: Jul. 19, 2012, Available at: http://publib.boulder.ibm.com/infocenter/hatshelp/v75/index.jsp?topic=/com.ibm.hats.doc/doc/gsintro.htm, 13 pages.

"Kendo UI," Retrieved on: Jul. 19, 2012, Available at: http://www.kendoui.com/web.aspx, 7 pages.

"Molu Software Update," Retrieved on: Apr. 11, 2012, Available at: http://www.mophilly.com/kb/index.php/Molu_Software_Update, 6 pages.

* cited by examiner ics on a page with in the patent. The resulting from the Mar-
AUTOMATICALLY UPDATING APPLICATIONS ON A CLIENT'S DEVICE WITHOUT INTERRUPTING THE USER'S EXPERIENCE

CROSS REFERENCE TO RELATED APPLICATION

This application claims priority from U.S. Provisional Application No. 61/605,119, filed Feb. 29, 2012, which application is incorporated herein by reference in its entirety.

BACKGROUND

Updating of client applications is well known. Currently, when an application is opened on a client device, a pop-up window can appear informing the user of updates and requesting that the latest software be downloaded. This often requires the user to wait while the new software is downloading and then generally restart the client to ensure the software update takes effect. Thus, updates can interrupt the user experience, and, if they occur too frequently, can annoy users.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, parts of an application can be delivered through a network without having to download the entire application. Thus, updates can be downloaded at runtime, without the user needing to be involved. When an application is installed, HTML, CSS and JavaScripts® or other User Interface (UI) files can be copied into local cache. A version number can also be stored with this code, so that when the application is launched, a web service checks the latest version on a server computer. If the latest version differs from the cached version, then an update is needed. New UI files can then be downloaded to the local cache. This can be a single page of the UI is updated through this mechanism. The local cache can be a folder that is used by the application, wherein the folder is stored on a hard drive of the client device.

The foregoing and other objects, features, and advantages of the invention will become more apparent from the following detailed description, which proceeds with reference to the accompanying figures.

DETAILED DESCRIPTION

Figure 1:
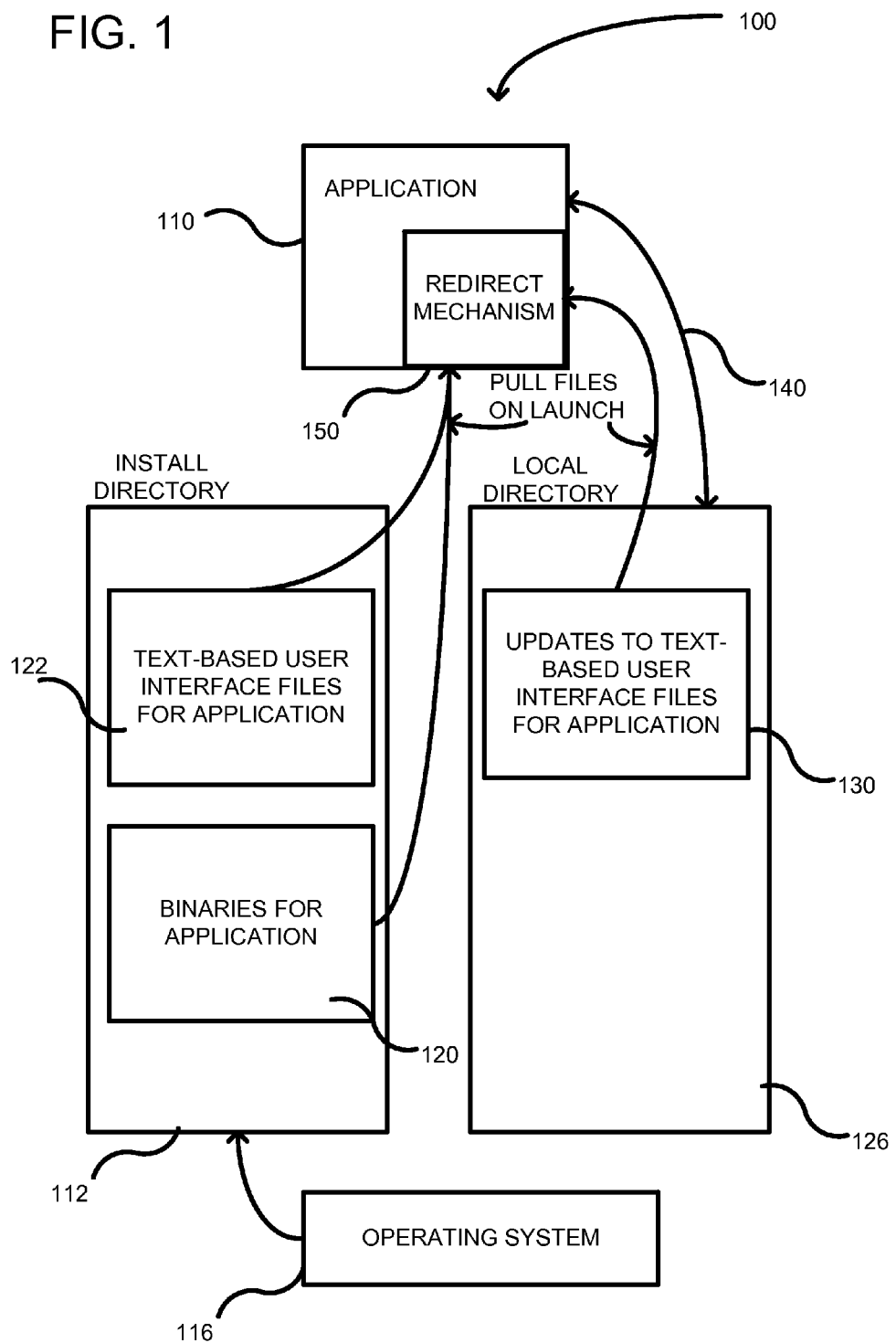
FIG. 1 shows an example architecture used for updating an application.

As a general overview, the disclosed systems and methods describe embodiments used to update client applications. An initial download of the application can be from the AppStore (or OEM preinstall). As with all AppStore downloads, installation involves downloading a package, such as a zip file. That package gets opened and the resulting files copied to a unique location in the user's AppData path.

The application package can include a full copy of the HTML Templates, CSS and JavaScript® (HCJ), as well as the corresponding native binaries. The actual data for the Marketplace pages need not be part of the HTML delivered in .cab files. The data can be delivered at runtime to those HTML templates though either the server-based services or through a common shim that abstracts the details of those services from the client.

In offline mode, the user can run a full version of the application from their local store. The templates can load locally and display local content. Since the HTML may still be available offline, it can be fully offline aware and properly message to the user what parts are not available. The first time that the application launches after install (or any AppStore update), it can clear out its LocalStore folder and copy all of its HCJ to that folder. HCJ can always be loaded from the LocalStore, instead of out of the package directory.

Each time the application launches, it can make a quick web call to check for a new version. The web service can return the current HCJ and binary versions, along with an optional dialog string that can be displayed to the user during the update. The Client code can be responsible for comparing its current versions to determine if either a HCJ or binary update is required.

If a new binary version is required, the user can be presented with a dialog option. For example, the user can be told that a new version is available and in order to use the online functionality, they will have to go to the AppStore and update their application. The user can be prevented from going online until they have updated, and they will be offered the option to continue in offline mode which will use the files stored on the machine and all online functionality will be disabled.

If any of the HCJ has been updated, then a new HCJ version can be available from the service. The updater will download a new .cab file from the web service. This cab or package file can contain all of the HCJ that the application needs to run offline.

One alternative is to download only the HCJ that has changed. This would make the .cab file smaller, but would significantly add to the complexity of the feature, and especially the test matrix. For security reasons, the .cab can be signed. The download can take place in native code on the client and be done through HTTP. The native code can check the signing.

Once the updater downloads its .cab file, it can open the file and copy the contents to the package's LocalStore folder that will mirror the package's directory layout. As both the updated and non-updated HCJ have been copied to the LocalStore, the application can simply run out of the LocalStore as a local copy of the site.

Each AppStore package has a default html file that can be within that application's package install directory. An example file can be "CheckVer.html" (name TBD). CheckVer can be a simple page with some JavaScript® that calls the Updater. Once complete, CheckVer.html can continue to be the main frame of app and can host all the downloaded HCJ. The CheckVer.html, and its JavaScript® can be the only HCJ files outside of the update mechanism. A binary version update can be required to update them.

FIG. 1 shows an embodiment of an architecture 100 that can be used for updating applications. An application 110 can reside on a client device, such as a computer, mobile device, etc., in an install directory 112. The install directory 112 can have limited write access, such as by an operating system 116, but may not be accessible for writes from the application 110. As shown in the install directory 112, the application can have a plurality of files that are used in executing the application. For example, binaries 120 can be used in conjunction with text-based user interface files 122. The text-based user interface files 122 can be any of a variety of file types that are typically interpreted at run time, such as HTML, CSS and JavaScript® files. Thus, a local directory 126 can also have copies or updates to the text based files 122 as shown at 130. The local directory 126 is accessible for read and write operations as shown by arrow 140. The application 110 can include a redirect mechanism 150. The redirect mechanism 150 can include software for checking the local updates directory 126 for an installed version of text-based user interface files 130. If the files are not present in the local directory 126, then the redirect mechanism can use the text-based user interface files 122 in the install directory. Thus, the redirect mechanism 150 can pull the files on launch of the application 110 that need to be loaded to start the application and the files to pull can be located in multiple directories. The redirect mechanism can pull the updates 130 and ignore the associated older version of the files in the install directory 112.

Figure 2:
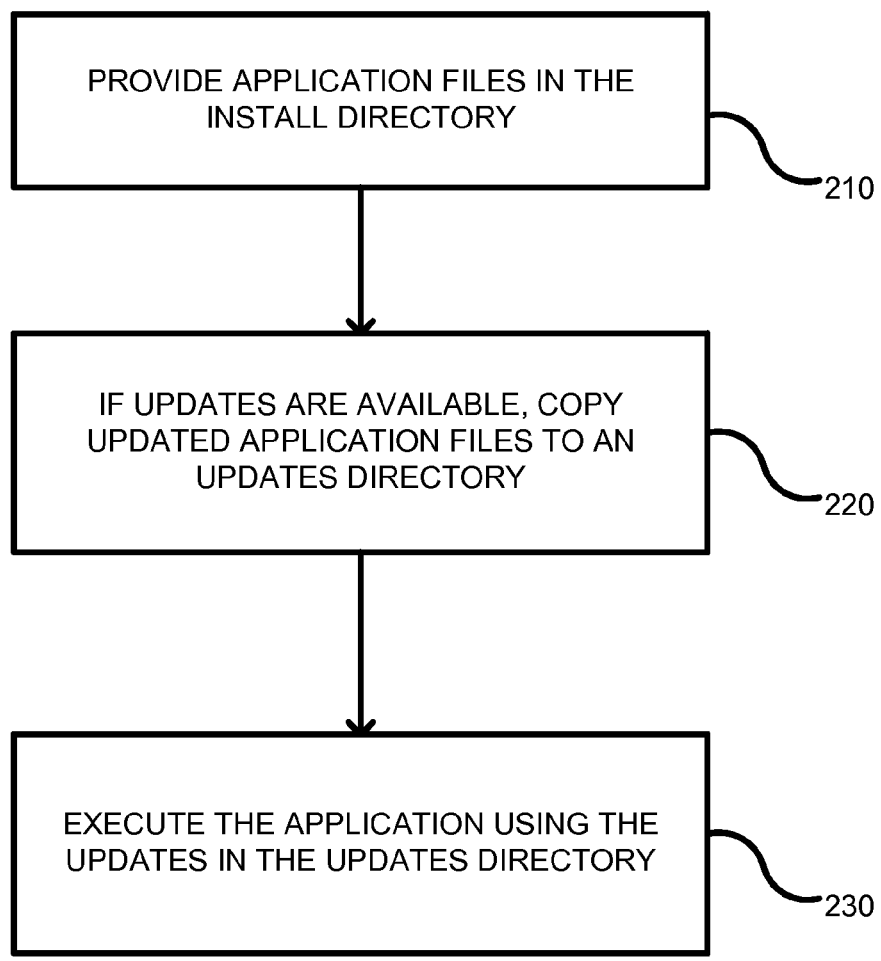
FIG. 2 shows an example flowchart for updating an application.

FIG. 2 is a flowchart of a method that can be used for updating a client device. In process block 210, application files can be provided in an install directory. Generally, the application is downloaded, such as by accessing an AppStore, and following a sequence of questions to download the application. An operating system can be involved for allowing write access to the install directory. The application can then be launched and used multiple times until updates are available. In process block 220, upon detection that updates are available, the updated application files can be copied to the local updates directory. The updates are downloaded through control of the application itself, rather than through the AppStore. Thus, the application can obtain the updates and store the updates in the local directory. In process block 230, the application can be executed using the updates in the updates directory as well as binaries located in the install directory. If there is an earlier version of the application files in the install directory, with an updated version in the local directory, then the updated current version supersedes the installed version.

Figure 3:
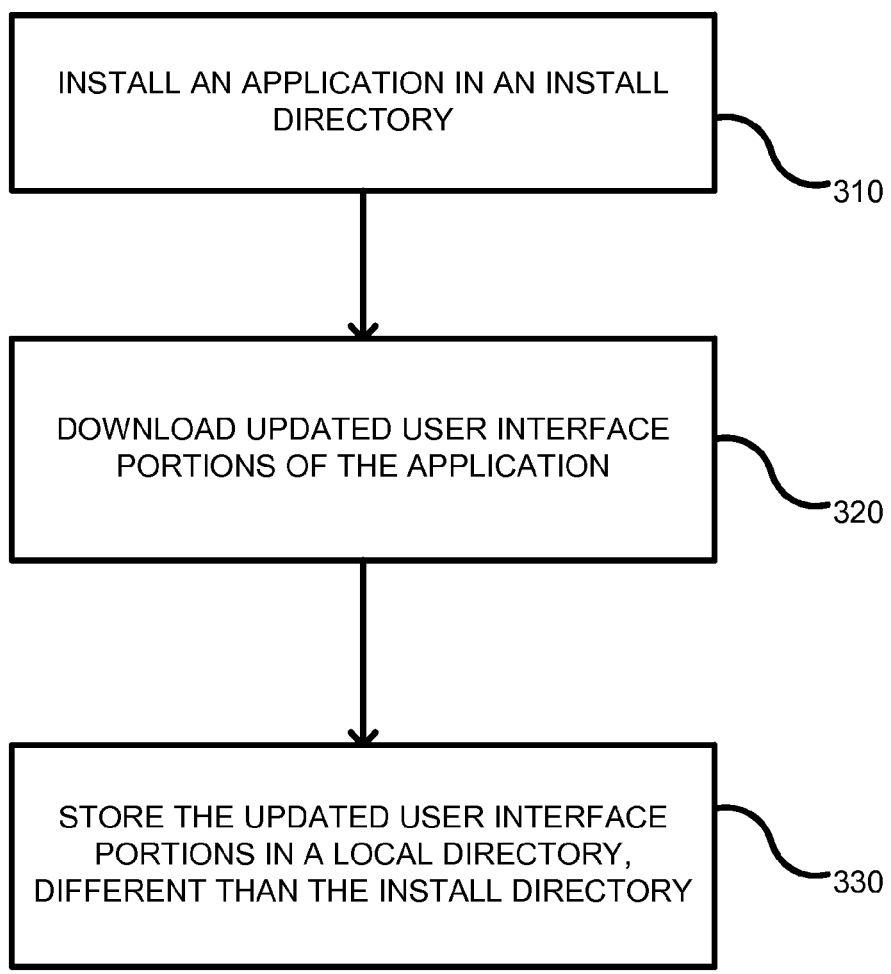
FIG. 3 shows another embodiment of a flowchart that can be used for updating an application.

FIG. 3 is a flowchart of another embodiment for updating a client device. In process block 310, an application can be installed in an install directory. The application can comprise multiple files, including binary files, such as executables, and text-based files that can be interpreted at run time, such as HTML files, JavaScript® files, CSS files, etc. In process block 320, updates of the user interface portions of the application can be downloaded from a server computer. The user interface portions can be a plurality of files and the downloads can be performed by the application itself. In process block 330, the updated user interface portions can be stored in the local directory, which is separate from the install directory. Old versions of files that are in the install directory can remain. The application can load the update files when launching, rather than the install directory.

Figure 4A:
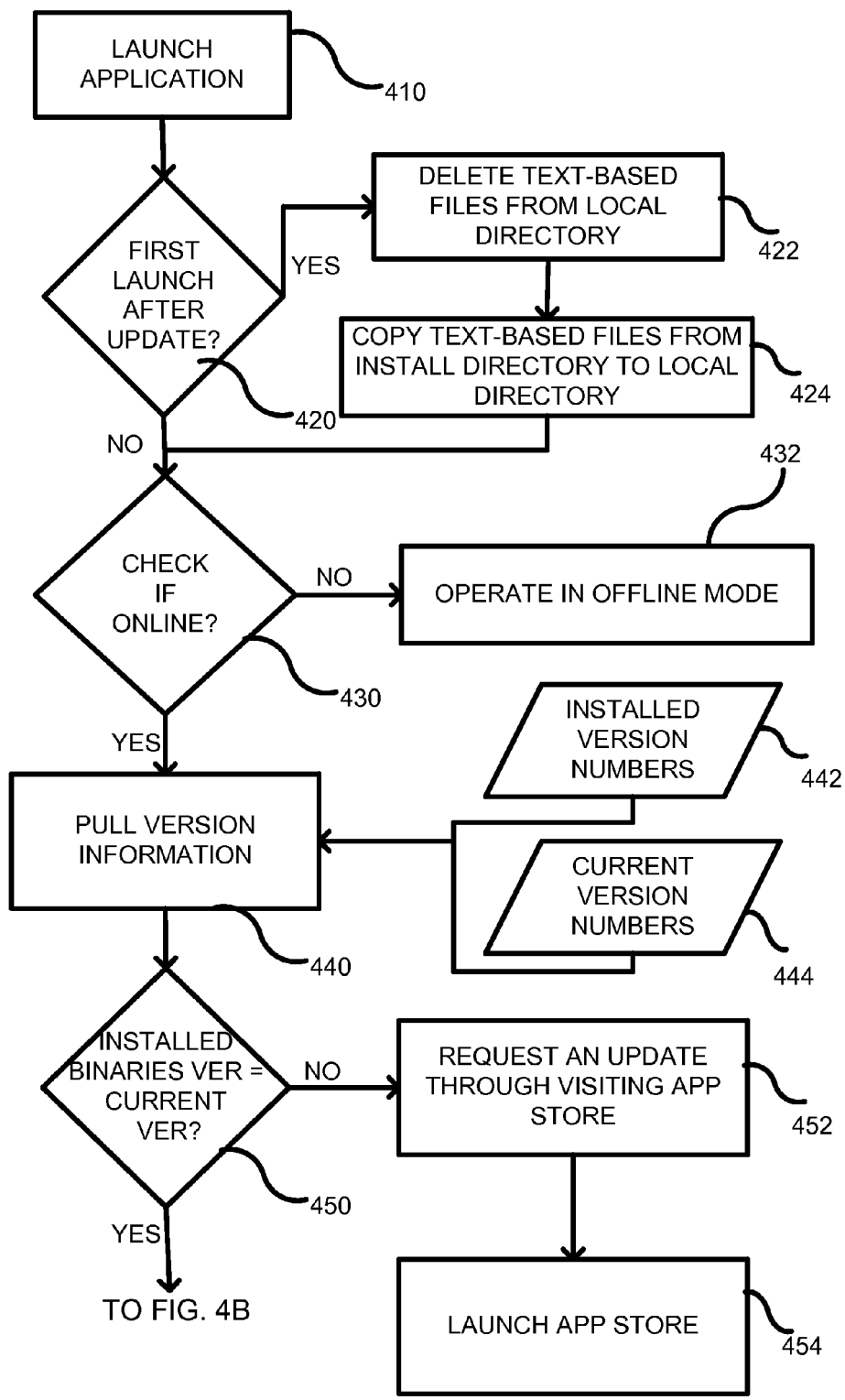
FIGS. 4A and 4B show a particular detailed implementation for updating an application.
Figure 4B:
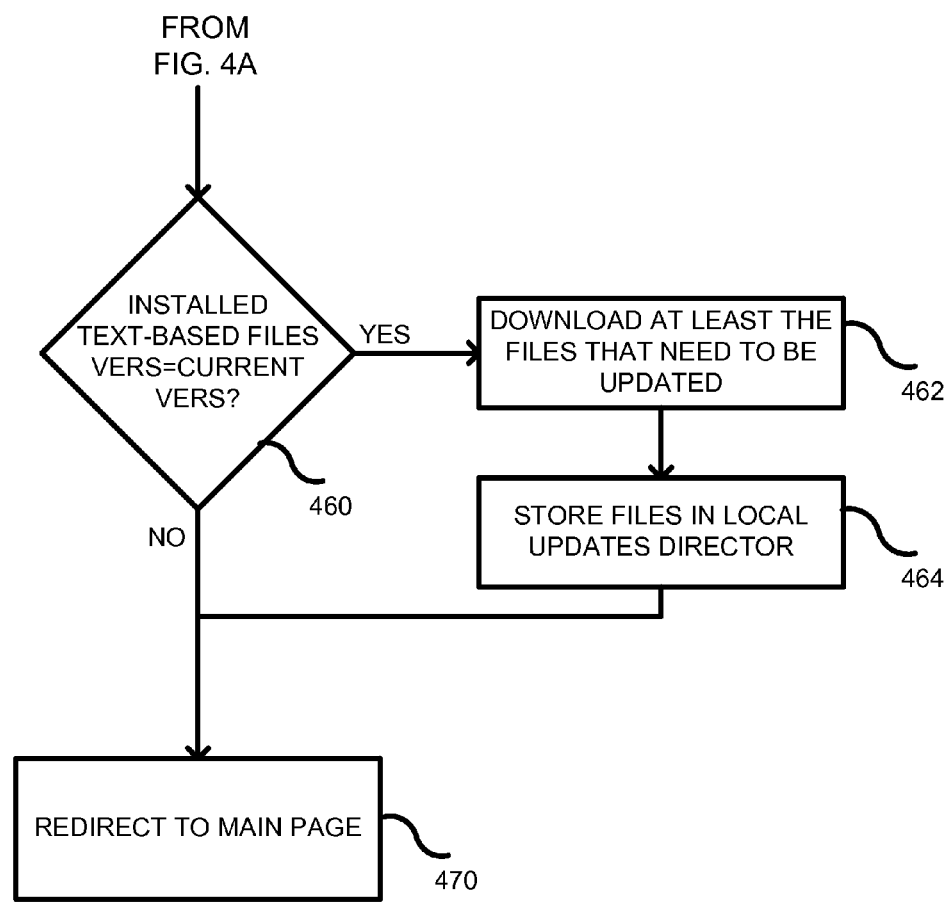

FIGS. 4A and 4B show a detailed flowchart of an embodiment that can be used for updating an application. In process block 410, an application is launched. Launching an application is well understood in the art, and generally includes a user selecting a program for execution, but other automated launching techniques can be used. In decision block 420, a check is made to determine if this is a first launch after an update. A flag can be stored on the client device to indicate whether this is the first launch or not. The check can be to determine the state of such a flag. The update is generally an update that changes the files in the install directory, rather than the local directory. If decision block 420 is answered in the affirmative, then at process block 422, text-based files can be deleted by the application itself in the local directory. Thus, outdated files are removed from the local directory. In process block 424, the text-based files can be copied from the install directory to the local directory. Binary files need not be copied, as the binaries can be used from the install directory. In decision block 430 a check is made as to whether the client device is connected to a network, such as the Internet. If not, then at process block 432, the application can run in an offline mode. If the client device is online, then at process block 440, the application can retrieve file version numbers. In particular, the application can retrieve its own installed version numbers 442, which are available on the client device. The version numbers can be stored in a version number attribute located in the file itself or separately therefrom. Additionally, the application can download the current version numbers 444 from a server computer coupled to the client device through a network. The version information can be version numbers for both text-based files and binaries. In decision block 450, a check is made to determine if the installed binaries version is equal to the current version by a simple comparison of the two. If not, then at 452, a request is made to the user to update the application by visiting an AppStore. If the user agrees, the AppStore is launched at 454. Thus, binaries in the install directory can be prevented from being updated by the application, whereas text-based files can be updated by the application. Forcing updating the binaries through the AppStore provides additional protection to the client device. If the installed binaries are the current version, then the flow proceeds to FIG. 4B.

FIG. 4B shows the continuation of FIG. 4A with decision block 460 wherein a check is made to determine if the version of the installed text-based files is different than the current version from the server. Thus, in terms of updates, the text-based files are treated differently than the binaries and have a different flow. The reason is, in part, because the application can have authorization to download the text-based files, wherein it can lack authorization to download the binaries. If decision block 460 is answered in the positive, then in process box 462, the application downloads from a server at least the files that need to be updated. In some embodiments, an encrypted version of all the text-based files can be downloaded. In process block 464, the downloaded files are stored in a local updates directory. In process block 470, the application launch begins with a redirect routine, which can be an HTML file. The redirect routine can decide whether to load files from the updates directory or the install directory.

Figure 5:
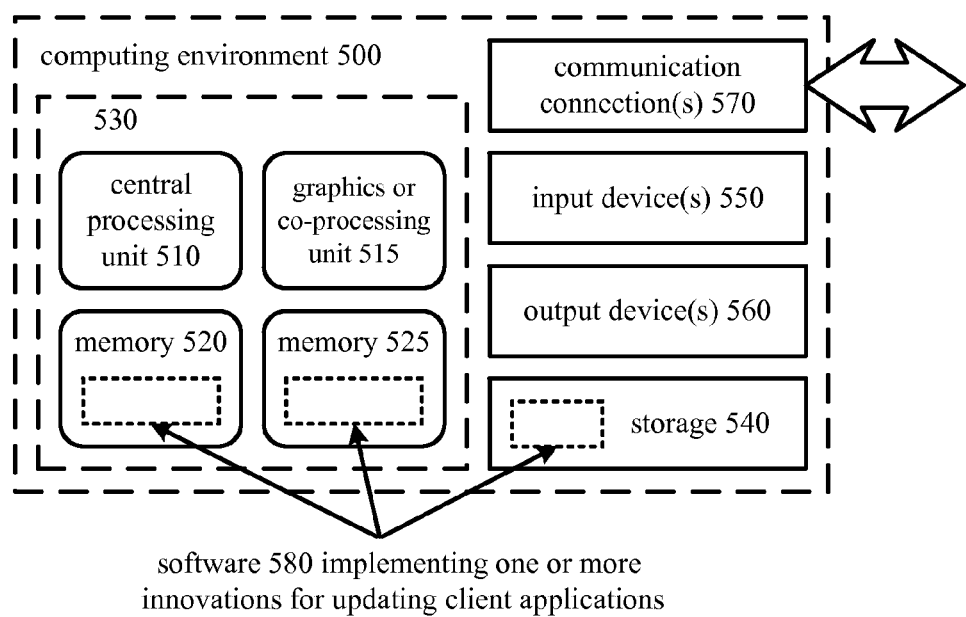
FIG. 5 shows a computer architecture that can be used in association with an application according to embodiments described herein.

FIG. 5 illustrates a generalized example of a suitable computing environment (500) in which several of the described techniques and tools may be implemented. The computing environment (500) is not intended to suggest any limitation as to scope of use or functionality, as the techniques and tools may be implemented in diverse general-purpose or special-purpose computing environments.

With reference to FIG. 5, the computing environment (500) includes one or more processing units (510, 515) and memory (520, 525) that can be used in implementing a computing device. In FIG. 5, this most basic configuration (530) is included within a dashed line. The processing units (510, 515)

execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 5 shows a central processing unit (510) as well as a graphics processing unit or co-processing unit (515). The memory (520, 525) may be volatile memory (e.g., registers, cache, RAM), non-volatile memory (e.g., ROM, EEPROM, flash memory, etc.), or some combination of the two, accessible by the processing unit(s). The memory (520, 525) stores software (580) implementing one or more innovations for updating client applications.

A computing environment may have additional features that can be used for implementing embodiments described herein. For example, the computing environment (500) includes storage (540), one or more input devices (550), one or more output devices (560), and one or more communication connections (570). An interconnection mechanism (not shown) such as a bus, controller, or network interconnects the components of the computing environment (500). Typically, operating system software (not shown) provides an operating environment for other software executing in the computing environment (500), and coordinates activities of the components of the computing environment (500).

The tangible storage (540) may be removable or non-removable, and includes magnetic disks, magnetic tapes or cassettes, CD-ROMs, DVDs, or any other medium which can be used to store information in a non-transitory way and which can be accessed within the computing environment (500). The storage (540) can store instructions for the software (580) implementing one or more innovations for updating client applications, as described herein.

The input device(s) (550) may be a touch input device such as a keyboard, mouse, pen, or trackball, a voice input device, a scanning device, or another device that provides input to the computing environment (500). For video decoding, the input device(s) (550) may be a video card, TV tuner card, or similar device that accepts video input in analog or digital form, or a CD-ROM or CD-RW that reads video samples into the computing environment (500). The output device(s) (560) may be a display, printer, speaker, CD-writer, or another device that provides output from the computing environment (500).

The communication connection(s) (570) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, or other carrier.

The techniques and tools can be described in the general context of computer-readable media. Computer-readable media are any available tangible media that can be accessed within a computing environment. By way of example, and not limitation, with the computing environment (500), computer-readable media include memory (520), storage (540), and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "select" to describe computer operations in a computing environment. These terms are high-level abstractions for operations performed by a computer, and should not be confused with acts performed by a human being. The actual computer operations corresponding to these terms vary depending on implementation.

Figure 6:
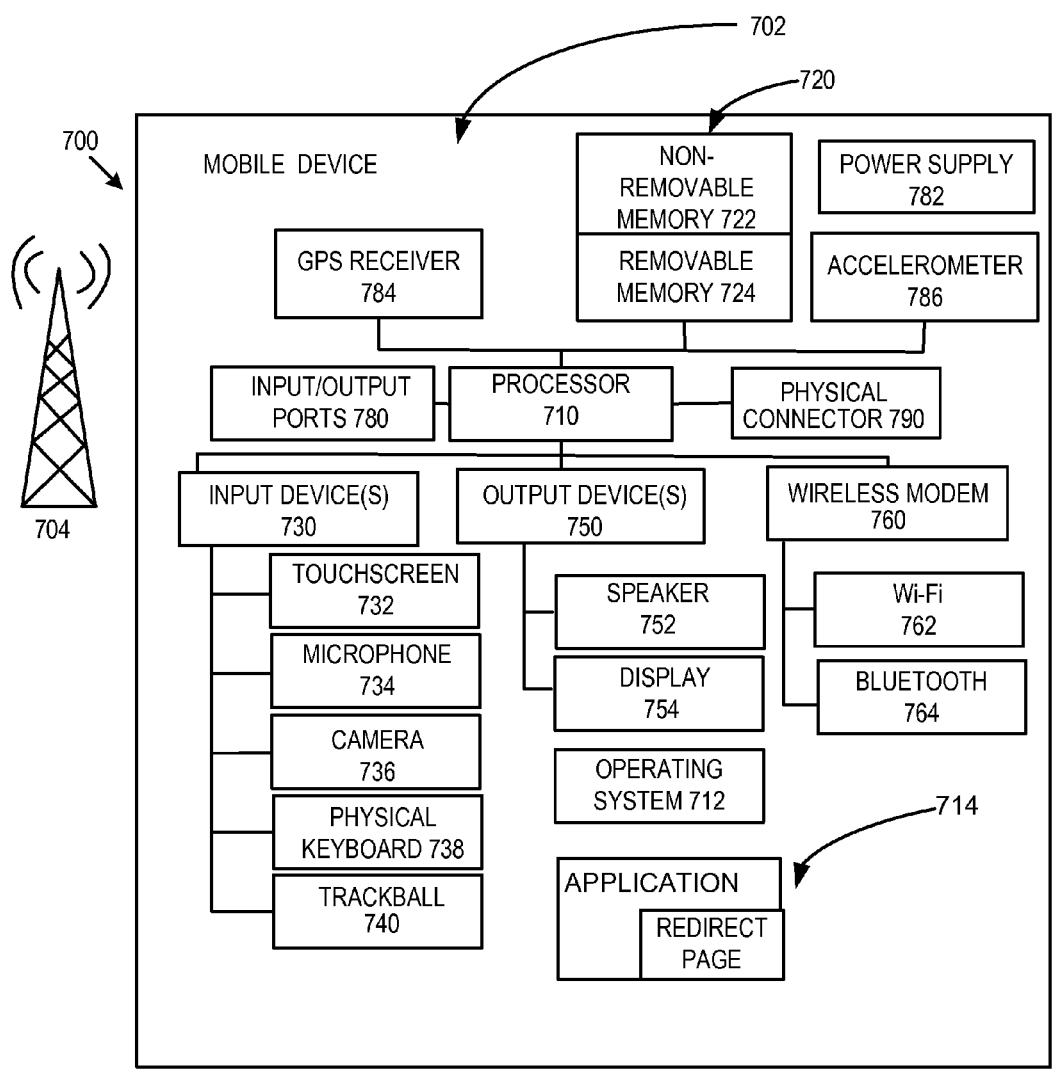
FIG. 6 shows an example mobile phone that can be used in association with an application according to embodiments described herein.

FIG. 6 is a system diagram depicting an exemplary mobile device 700 including a variety of optional hardware and software components, shown generally at 702. Any components 702 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 704, such as a cellular or satellite network.

The illustrated mobile device 700 can include a controller or processor 710 (e.g., signal processor, microprocessor, ASIC, or other control and processing logic circuitry) for performing such tasks as signal coding, data processing, input/output processing, power control, and/or other functions. An operating system 712 can control the allocation and usage of the components 702 and support for one or more application programs, such as application program 714. The application program 714 can include a redirect page for loading the application from both an install directory and a local directory, as described herein.

The illustrated mobile device 700 can include memory 720. Memory 720 can include non-removable memory 722 and/or removable memory 724. The non-removable memory 722 can include RAM, ROM, flash memory, a hard disk, or other well-known memory storage technologies. The removable memory 724 can include flash memory or a Subscriber Identity Module (SIM) card, which is well known in GSM communication systems, or other well-known memory storage technologies, such as "smart cards." The memory 720 can be used for storing data and/or code for running the operating system 712 and the applications 714. Example data can include web pages, text, images, sound files, video data, or other data sets to be sent to and/or received from one or more network servers or other devices via one or more wired or wireless networks. The memory 720 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 700 can support one or more input devices 730, such as a touchscreen 732, microphone 734, camera 736, physical keyboard 738 and/or trackball 740 and one or more output devices 750, such as a speaker 752 and a display 754. Other possible output devices (not shown) can include piezoelectric or other haptic output devices. Some devices can serve more than one input/output function. For example, touchscreen 732 and display 754 can be combined in a single input/output device.

A wireless modem 760 can be coupled to an antenna (not shown) and can support two-way communications between the processor 710 and external devices, as is well understood in the art. The modem 760 is shown generically and can include a cellular modem for communicating with the mobile communication network 704 and/or other radio-based modems (e.g., Bluetooth or Wi-Fi). The wireless modem 760 is typically configured for communication with one or more cellular networks, such as a GSM network for data and voice communications within a single cellular network, between cellular networks, or between the mobile device and a public switched telephone network (PSTN).

The mobile device can further include at least one input/output port 780, a power supply 782, a satellite navigation system receiver 784, such as a Global Positioning System (GPS) receiver, an accelerometer 786, and/or a physical connector 790, which can be a USB port, IEEE 1394 (FireWire) port, and/or RS-232 port. The illustrated components 702 are not required or all-inclusive, as any components can deleted and other components can be added.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., non-transitory computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript®, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

We claim:

1. A method of updating a client device, comprising:
providing application files in a first install directory on the client device;
upon launching of an application using the application files, automatically checking to determine whether updates are available for the application;
if updates are available, determining whether the updates are for binary files or for text-based files;
if the updates are for binary files of the application, then requesting user permission to download the updates;
if the updates are for text-based files, then copying updated application files to a second updates directory on the client device, different than the install directory without user permission so that updates of binary files of the application are treated differently than text-based files of the application; and
executing the application using at least the updates located in the second updates directory, while ignoring an older version of the updated application files that remain in the install directory during execution of the application.

2. The method of claim 1, wherein the updates are text-based files that are interpreted at runtime.

3. The method of claim 2, wherein the text-based files include one or more of the following file types: HTML files, script files, CSS files.

4. The method of claim 1, wherein the updated files are user interface files.

5. The method of claim 1, wherein automatically checking to determine whether updates are available includes storing a version number attribute on the client device that is associated with a stored version of the application, downloading a current version of the application from a server computer and comparing the stored version to the current version.

6. The method of claim 5, wherein if the stored version and the current version are different, determining that updates are available.

7. The method of claim 5, wherein the version number is associated with application files in the second updates directory and the first install directory.

8. The method of claim 1, wherein the application itself installs the updates to the second updates directory and the application does not have authorization to store files in the first install directory.

9. The method of claim 2, wherein updating the text-based files includes updating all text-based files that are used for user interface elements if any text-based file needs to be updated.

10. One or more computer-readable nonvolatile storage media storing instructions thereon for executing a method, the method comprising:

installing an application onto a client device in an install directory, including first user interface portions of the application;

downloading, from a server computer, updated user interface portions of the application to the client device that represent updates to the first user interface portions, wherein the application can automatically initiate the updates without requiring user authorization, whereas other portions of the application require user authorization to initiate the updates;

storing the updated user interface portions in a local directory that is different than the install directory, while maintaining the first user interface portions of the application in the install directory; and launching the application using the updated user interface portions while ignoring the first user interface portions.

11. The method of claim 10, wherein the user interface portions are downloaded by the application itself.

12. The method of claim 10, wherein the application includes a check version procedure that compares server-side application files to either application files in the install directory or application files in the local directory.

13. The method of claim 10, wherein the updated user interface portions include only text files that have changed.

14. The method of claim 10, wherein the updated user interface portions include all of the text files regardless of whether they changed or not.

15. The method of claim 10, further including checking a web service on startup to determine if new user interface updates are available.

16. The method of claim 10, wherein the user interface updates are for HTML, CSS and/or script files.

17. A method of displaying user interface elements on a client device, comprising:

in response to a first launch of an application after an update, deleting text-based files from a local store directory and copying text-based files from an install directory to the local store directory;

downloading one or more current version numbers for the text-based files from a server computer;

comparing the one or more current version numbers to installed version numbers of the text-based files stored in the local store directory;

if the current version numbers do not match the installed version numbers, downloading at least the text-based files that do not match without acquiring authorization from a user;

storing the text-based files in the local store directory, while maintaining an older version of the text-based files in the install directory;

downloading one or more current version numbers for binary files from the server computer;

comparing the one or more current version numbers for the binary files to installed version numbers for the binary files;

if the current version numbers for the binary files do not match the installed version numbers, requesting authorization from the user to download the binary files; and launching the application using at least one file from the install directory and the text-based files in the local store directory.

18. The method of claim 17, further including downloading all of the text-based files if even one version number does not match.

19. The method of claim 17, further including launching a redirection page when launching the application that uses files from the local store directory if they are present, and uses files from the install directory if they are not in the local store directory.

* * * * *